(No Model.) 2 Sheets—Sheet 1.
M. JOSEPHSON.
VEGETABLE GRATER.
No. 510,141. Patented Dec. 5, 1893.
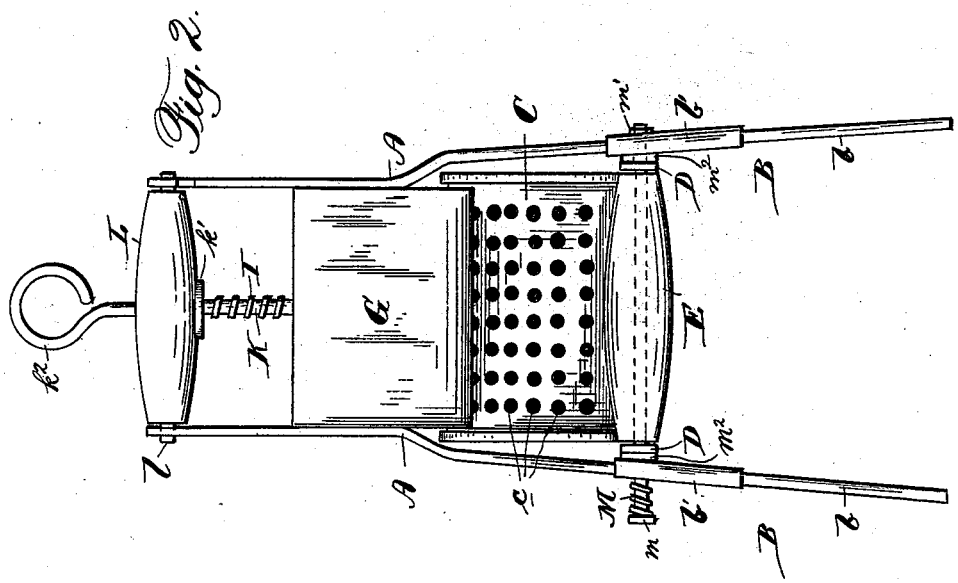
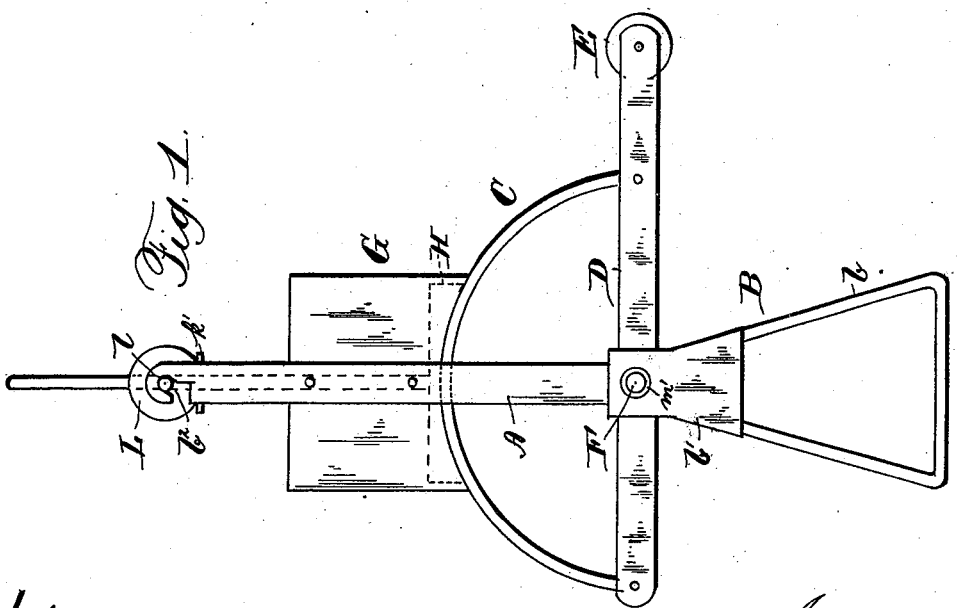
Witnesses:
Wm E. Coulter
C. A. Michener
Inventor:
Moses Josephson
by his attorney,
H. B. Willson

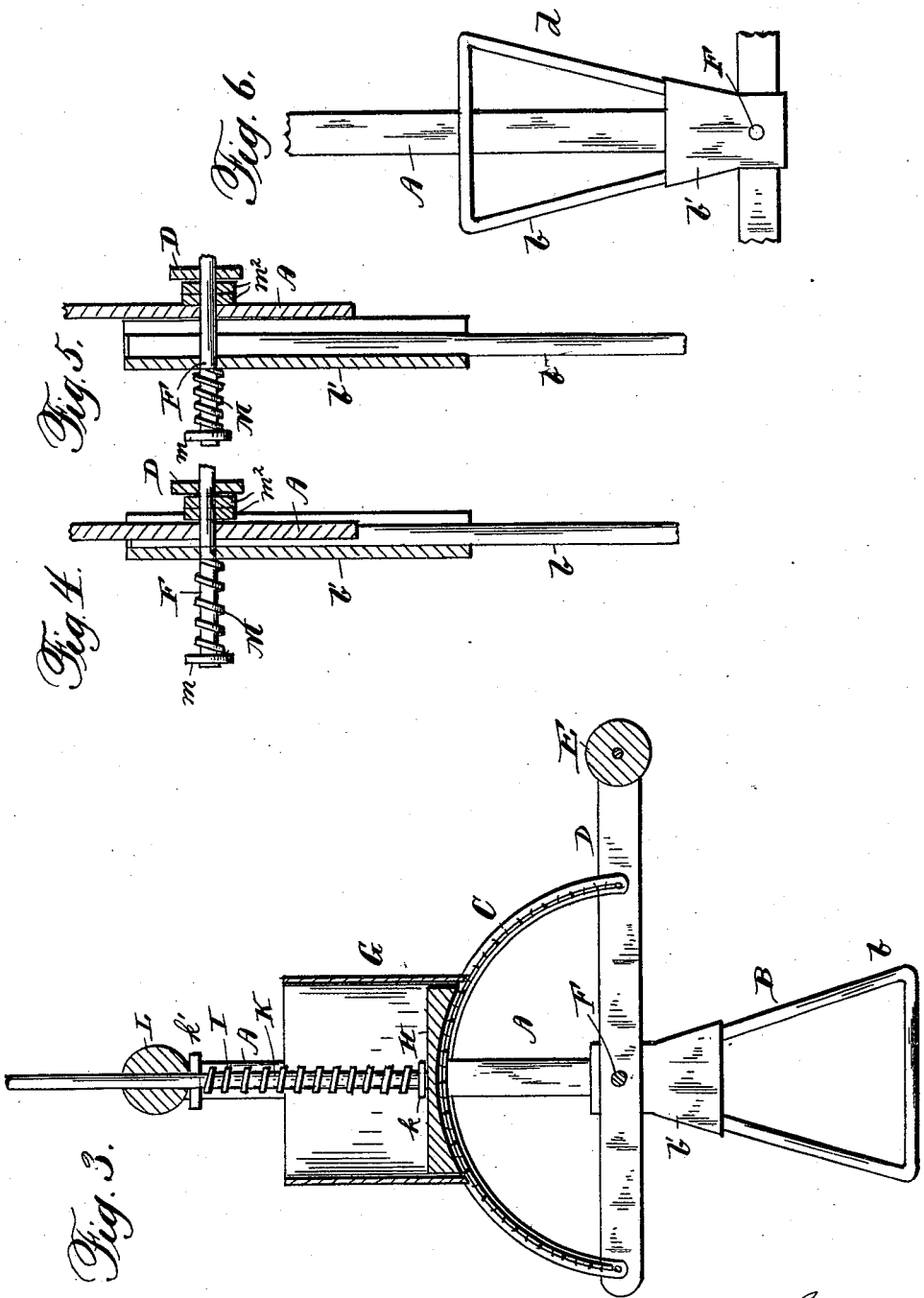

UNITED STATES PATENT OFFICE.

MOSES JOSEPHSON, OF SPRINGFIELD, ILLINOIS.

VEGETABLE-GRATER.

SPECIFICATION forming part of Letters Patent No. 510,141, dated December 5, 1893.

Application filed April 7, 1893. Serial No. 469,389. (No model.)

*To all whom it may concern:*

Be it known that I, MOSES JOSEPHSON, a citizen of the United States, residing at Springfield, in the county of Sangamon and State of Illinois, have invented certain new and useful Improvements in Vegetable-Graters; and I do hereby declare the following to be a full, clear, and exact description of the invention, such as will enable others skilled in the art to which it appertains to make and use the same.

My invention has relation to vegetable graters, and among the objects sought to be attained by my invention is to provide a simple, inexpensive, efficient and convenient device by means of which various kinds of vegetables or fruit, &c., may be quickly and economically grated.

My invention consists in the novel construction, arrangement and combination of parts whereby I attain the desired objects, all as hereinafter fully described, illustrated in the accompanying drawings, and pointed out in the appended claims.

In the drawings:—Figure 1 is a side elevation of my improved grater. Fig. 2 is a front elevation thereof. Fig. 3 is a vertical longitudinal section of the grater. Figs. 4 and 5 are detail sectional views showing the manner of pivoting and reversing the supporting legs. Fig. 6 is a side view showing the supporting leg reversed.

In carrying out my invention I provide upon opposite sides of the device suitable supporting standards A, A, to the lower ends of which are pivotally connected in a manner more fully described hereinafter, the supporting legs B, B, which may be of any desired form, the legs shown consisting of the angularly bent wire rods $b$, which are secured within and to the plates $b'$.

C indicates a semi-cylindrical grating device which is formed from a sheet of tin and perforated as at $c$, so as to provide a grating surface. The ends of the grater C are secured to the longitudinally arranged bars D which are provided at their front ends with a handle E, and are pivoted near their centers upon a shaft F which extends transversely of the device and having its bearings in the lower ends of the standards and the the plates $b'$. It will thus be seen from the described arrangement of the parts that a person may readily oscillate the grater C upon the shaft F by means of the handle E.

G indicates a receptacle for the substance to be grated which receptacle may be of any desired shape, though I prefer to make it in a substantially rectangular shape, the lower ends of the sides of which are curved to conform to the rounded grating surface C so that said receptacle may be positioned in close proximity to the latter, as shown.

The receptacle G is secured to and between the upper portions of the standards A, A, and is open at its top so as to permit the substance to be grated to be inserted in it.

For the purpose of keeping the substance while being grated constantly in contact with the grating surface and at the same time exert some pressure upon the substance whereby the grating of the same may be more readily and quickly accomplished, I provide a follower H which is of a shape corresponding with that of the receptacle, within which latter it is arranged and adapted to slide. The under surface of the follower is curved to conform to the grating surface C, and said follower is constantly forced downwardly within the receptacle by means of a coiled spring I which encircles a vertically-arranged rod K whose lower end is secured to the follower, and which passes loosely through a cross bar L. Upon the rod K adjacent to the follower is secured a washer $k$, and also secured upon said rod adjacent to the crossbar L. is a washer $k'$, the ends of the spring I bearing upon said washers, as shown. Thus the follower is yieldingly pressed down upon the substance to be grated which is placed within the receptacle between the grating surface C and the said follower, and in this manner all the substance will be grated whereby I secure economy in the use of my device.

For the purpose of rendering the cross-bar readily removable and with it the follower, I provide the standards at the upper ends with slots $b^2$, within which are loosely mounted the lugs $l$, with which the cross-bar is provided. Thus the ends of said shaft may be pressed down and out of the slots after which the parts may be removed from the receptacle, and the substance to be grated inserted in the latter. The upper end of the rod K is formed into a loop $k^2$, to serve as a means for lifting and carrying the device.

I prefer to so pivot the supporting legs B, to the standards, that said legs may when desired or when the grater is not in use, be reversed in their position, that is to say, so that they will lie against the standards A, A, as shown in Fig. 6, and for this purpose the upper ends of the rods $b$, are secured upon the rear sides of the plates $b'$ and through said plates passes the shaft F. Both the plates $b'$ are held closely against the lower ends of the standards as in Figs. 1, 2 and 4, by means of a coiled spring M which encircles the extended end of the shaft and bears against the washer $m$, and the plate $b'$. The opposite end of the shaft is provided with a washer $m'$ upon the outer side of the other plate $b'$. Thus the stress of the spring tending to force the shaft endwise in an outwardly direction causes the plates to be held closely against the standards in a position to properly and firmly support the device, as in Figs. 1 to 3. Now should it be desired to reverse the position of the legs when the grater is not in use, so that said legs will lie as in Fig. 6, the plates $b'$ are forcibly drawn outwardly from the ends of the standards until the rear edges of the plates will clear the standards, as seen in Fig. 5, when the said legs may be turned upon the shaft into the position shown in Fig. 6 and by then releasing the plates, the same will owing to the action of the spring be forced into contact with the standards.

The arrangement and relative position of the supporting legs and standards, and grater C are such that a receptacle may be placed beneath said grater to receive the grated material falling through the grating surface.

Washers $m^2$, may be arranged upon the shaft F between the bars D and the lower ends of the standards.

It will be seen from the foregoing description of my improved grater when taken in connection with the accompanying drawings, that I have provided a very simple, inexpensive and efficient device whereby various articles of food may be grated in a very rapid and economical manner, and the advantages of my device over those of like character will be readily apparent.

What I claim, and desire to secure by Letters Patent, is—

1. In a vegetable grater the combination with supporting legs and standards, the latter being provided with slots near their upper ends, of a receptacle secured between said standards, a follower arranged and adapted to slide within the receptacle, a rod to which the follower is connected, a cross-piece removably held within the slots of the standards, and a coiled spring encircling the rod and adapted to force the follower downwardly within the receptacle, and a grating device carried by the standards and adapted to be moved beneath the receptacle, as and for the purpose specified.

2. In a vegetable grater, the combination with the supporting legs and standards, of the semi-cylindrical grating device pivotally connected with said standards, a receptacle secured to the latter above the grating device, a follower arranged and adapted to slide within the said receptacle a rod to which the follower is secured, a cross-piece removably connected with the standards, a coiled spring adapted to force the follower downwardly, a loop at the upper end of the rod, and a handle carried by the grating device, all as and for the purpose specified.

3. The combination with the supporting standards, and a shaft passing therethrough, of legs mounted upon said shaft and adapted to be reversed relatively to the standards, in the manner and for the purpose specified.

4. The combination with the standards, and a shaft passing through the same, one end of said shaft being extended, as described of supporting legs pivoted upon the shaft, and a spring also arranged upon the latter and adapted to maintain the legs in contact with the standards, as and for the purpose specified.

5. In a vegetable grater, the combination with the supporting standards, and legs adapted to be reversed relatively to the same, of the receptacle secured between the standards, and open at top and bottom, a follower arranged and adapted to slide within the receptacle, and having a curved under surface a rod to which the follower is secured, a cross-piece through which said rod passes, a coiled spring encircling the rod and adapted to force the follower downwardly, a grating surface bent into semi-cylindrical form, bars to which said surface is secured, and a shaft passing through the standards and upon which the said bars are pivoted, and a handle carried by the bars, all arranged for operation, as and for the purpose specified.

In testimony whereof I affix my signature in presence of two witnesses.

MOSES JOSEPHSON.

Witnesses:
EDWARD STRITZ,
SAMUEL COHEN.